US009002413B2

(12) United States Patent
Furtney

(10) Patent No.: US 9,002,413 B2
(45) Date of Patent: Apr. 7, 2015

(54) BATTERY CELL PHONE COMBINATION

(71) Applicant: Terrence Michael Furtney, Elma, NY (US)

(72) Inventor: Terrence Michael Furtney, Elma, NY (US)

( * ) Notice: Subject to any disclaimer, the term of this patent is extended or adjusted under 35 U.S.C. 154(b) by 65 days.

(21) Appl. No.: 13/927,956

(22) Filed: Jun. 26, 2013

(65) Prior Publication Data

US 2014/0120866 A1    May 1, 2014

Related U.S. Application Data

(60) Provisional application No. 61/718,355, filed on Oct. 25, 2012.

(51) Int. Cl.
| H04B 1/38 | (2006.01) |
| H04M 1/00 | (2006.01) |
| H04M 3/00 | (2006.01) |
| H04W 52/02 | (2009.01) |
| H04M 1/02 | (2006.01) |

(52) U.S. Cl.
CPC ........ *H04W 52/0296* (2013.01); *H04M 1/0262* (2013.01)

(58) Field of Classification Search
CPC ................ H04M 1/0262; H04W 52/0296
USPC ................ 455/572, 573, 575.1, 419
See application file for complete search history.

(56) References Cited

U.S. PATENT DOCUMENTS

| 5,859,481 | A * | 1/1999 | Banyas ........................ 307/64 |
| 6,021,332 | A * | 2/2000 | Alberth et al. ............. 455/552.1 |
| 6,356,054 | B1 * | 3/2002 | Herrmann ..................... 320/115 |
| 7,251,509 | B1 * | 7/2007 | Wang et al. .................... 455/574 |
| 2002/0006814 | A1 * | 1/2002 | Fukunishi ..................... 455/572 |
| 2003/0013506 | A1 * | 1/2003 | Wang ............................ 455/573 |
| 2007/0285056 | A1 * | 12/2007 | Yoon et al. .................... 320/116 |
| 2008/0237355 | A1 * | 10/2008 | Ahn et al. ..................... 235/492 |
| 2010/0124896 | A1 * | 5/2010 | Kumar ....................... 455/404.1 |
| 2010/0130263 | A1 * | 5/2010 | Zhang et al. .................. 455/572 |
| 2010/0134305 | A1 * | 6/2010 | Lu et al. .................... 340/636.13 |
| 2010/0216522 | A1 * | 8/2010 | Bennis et al. ................. 455/572 |
| 2012/0131367 | A1 * | 5/2012 | Kamijima ..................... 713/323 |
| 2013/0106355 | A1 * | 5/2013 | Kim et al. ..................... 320/118 |
| 2014/0111961 | A1 * | 4/2014 | Liu et al. ...................... 361/814 |

* cited by examiner

*Primary Examiner* — Dung Hong
(74) *Attorney, Agent, or Firm* — Del Vecchio and Stadler LLP

(57) ABSTRACT

A battery cell phone combination for use in a cell phone or other electronic device having a case or housing is provided. The battery cell phone combination has a primary battery and a secondary battery each being shaped so as to be able to be received in the case. When the primary battery is drained the user can enable the secondary battery in a rapid manner and for a fee or for free. The primary and secondary batteries are isolated from each other such that there is no current seepage between the two. The cell phone is continuously powered when switching from the primary battery to the secondary battery such that calls are not dropped during the switching process.

15 Claims, 4 Drawing Sheets

BATTERY CELL PHONE COMBINATION

CROSS REFERENCE TO RELATED APPLICATION

This application claims the benefit of U.S. Provisional Application No. 61/718,355 filed on Oct. 25, 2012, the entire content of which is hereby incorporated herein by reference.

BACKGROUND

A cell phone is a tool used by the vast majority of people. Indeed, it is indispensable for many people for their work and recreation. And, the cell phone can be praised as being a life saving tool for lost people and injured people. The public frequently uses cell phones to contact authorities after accidents, crimes, and during medical emergencies.

However, cell phones all have to rely on a battery for power. When the battery loses its charge the cell phone becomes quite useless. Indeed, a cell phone that loses all its charge can result in important phone calls being cut short, whether they be business or social calls, and can become very problematic in crisis situations wherein the safety of the cell phone user is at issue. In addition, there are a plurality of electronic devices that use batteries for their power source, for example, laptop computers, notebook computers, iPhone®, iPads®, smart phones, ebook readers, personal digital assistants (PDA's) and other types of portable communication devices such as Walkie Talkies, and held transceivers, and battery driven devices. When the batteries in these devices are drained of power, numerous problems can arise.

What is needed is an improved way to overcome the problem of cell phones and other battery powered devices losing their charge.

SUMMARY

A battery cell phone combination is provided. The battery cell phone combination has a primary battery and a secondary battery that are fitted in a case or housing. When the primary battery is drained the user can enable the secondary battery in a rapid manner and for a fee or for free. The primary and secondary batteries are isolated from each other such that there is no current seepage between the primary and secondary batteries, and the primary and secondary batteries can be charged simultaneously in one of the preferred embodiments.

BRIEF DESCRIPTION OF THE DRAWING FIGURES

DESCRIPTION

Figure 1:
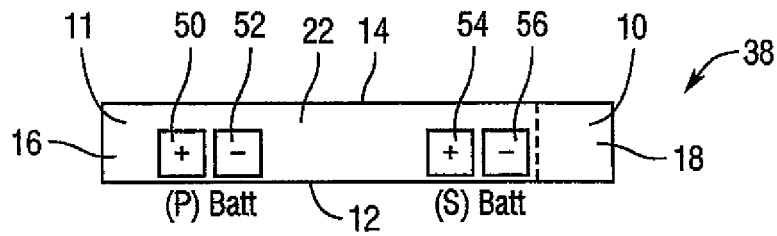
FIG. 1 is a top plan view of a cell phone battery wherein the case has a notched wall.
Figure 2:
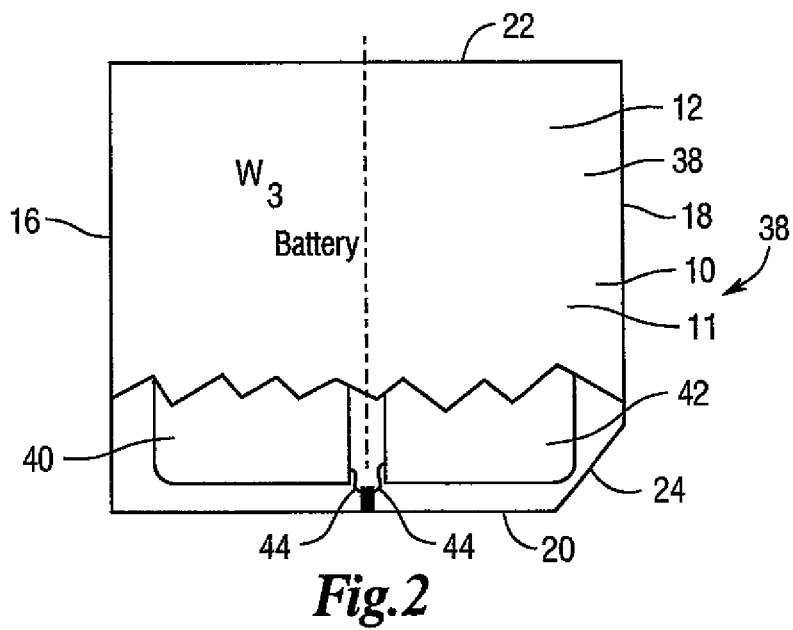
FIG. 2 is a front elevational view of the cell phone battery having a notched wall shown partly in broken line to delineate the primary and secondary batteries.
Figure 3:
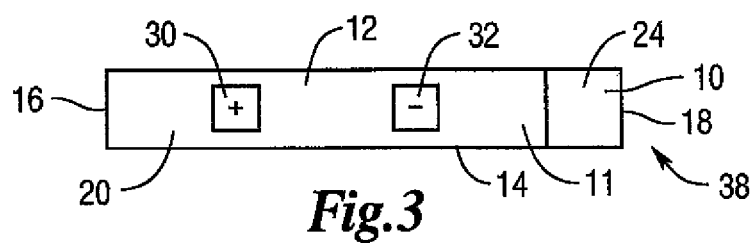
FIG. 3 is a bottom plan view of the cell phone battery having notched wall and showing the charging contacts.

FIGS. 1-3 and 7 show a battery cell phone combination 10 that includes a cell phone 15 and a battery assembly 38. In particular, the cell phone 15 has a cell phone housing 23 and the battery assembly 38 is disposed in the cell phone housing 23. The battery assembly 38 has a case or housing 11 having opposed first and second walls 12, 14, opposed first and second edge walls 16, 18, and a charging wall 20 and an opposed output wall 22. The case 11 has a notch wall 24 that meets with the first and second walls 12, 14, and meets with the second edge wall 18 and charging wall 20. The notch wall 24 is at an angle relative to the second edge wall 18 and the charging wall 20.

The charging wall 20 has a positive terminal 30 and a negative terminal 32 and is capable of receiving a charge from charging device 33 that can be embodied as any of a number of chargers, for example, a conventional cell phone charger. Chargers and charging devices for cell phone batteries and the batteries of other hand held devices can be embodied as AC wall adapters and car adapters, all of which are well known to those having ordinary skill in the art and will therefore not be described herein in greater detail. Cell and smart phone batteries, their construction and use are well known to those having ordinary skill in the art and are therefore not described in detail. When the cell phone 15 (shown in FIGS. 7 and 7A) is being charged, both the primary and secondary batteries 40, 42 are charged simultaneously via charging leads 44 disposed internal to the case 11 in a manner to be described presently. The notch wall 24 is provided as a key such that the user installs the cell phone battery 10 in the cell phone 15 properly and so that the user is prevented from turning over the battery cell phone combination 10 to access the back-up portion (the secondary battery 42). It is pointed out that cell phones 15 and the construction, use and operation of cell phones 15 is well known to those having ordinary skill in the art and is therefore not described in greater detail herein.

The output wall 22 has a primary battery positive terminal 50 and a negative primary battery terminal 52. The output wall 22 also has a secondary battery positive terminal 54 and a secondary battery negative terminal 56.

During normal daily usage, the primary battery 40 is used to power the cell phone 15, and during charging both the primary and secondary batteries 40, 42 are charged at the same time and the load 103 (FIG. 9) is powered. In addition, when current flows from each of the primary and secondary batteries 40, 42 the current is isolated. Thus, current is not capable of flowing from the primary battery 40 to the secondary battery 42 and vice versa.

Figure 4:
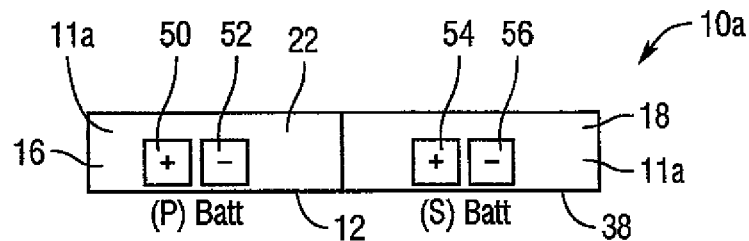
FIG. 4 is top plan view of a second embodiment of a cell phone battery.
Figure 5:
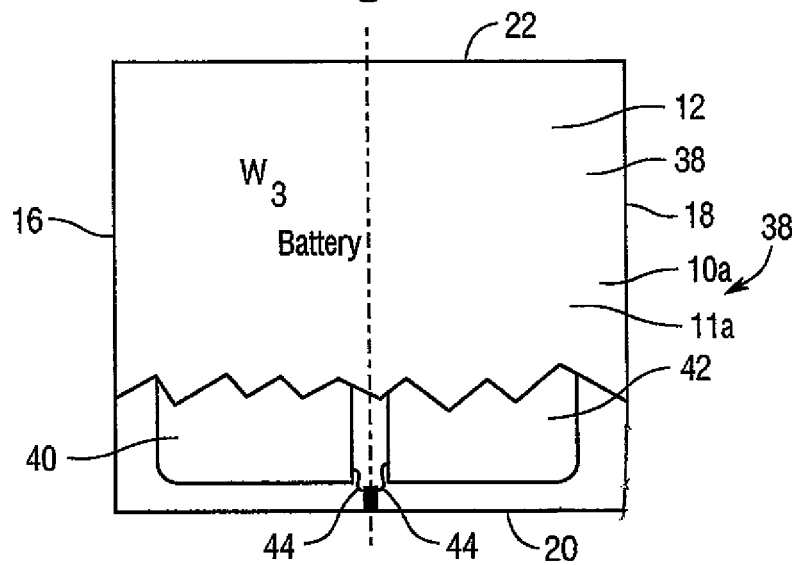
FIG. 5 is a front elevational view of the second embodiment of a full case cell phone battery shown partly in broken lines to delineate the primary and secondary batteries.
Figure 6:
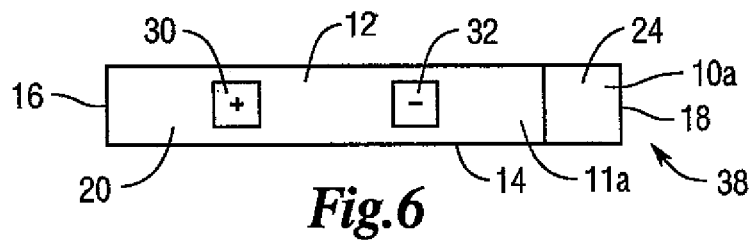
FIG. 6 is a bottom plan view of the second embodiment showing the charging contacts.

FIGS. 4-6 show another embodiment of the battery cell phone combination 10a wherein the housing or case 11a is constructed so that the notch wall 24 is absent. Otherwise, the second embodiment of the battery cell phone combination 10a is substantially identical to the above-described battery cell phone combination 10.

Figure 7:
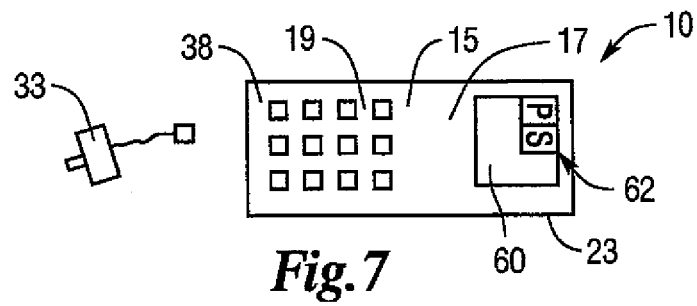
FIG. 7 is a top plan view of a cell phone and screen display.
Figure 7A:
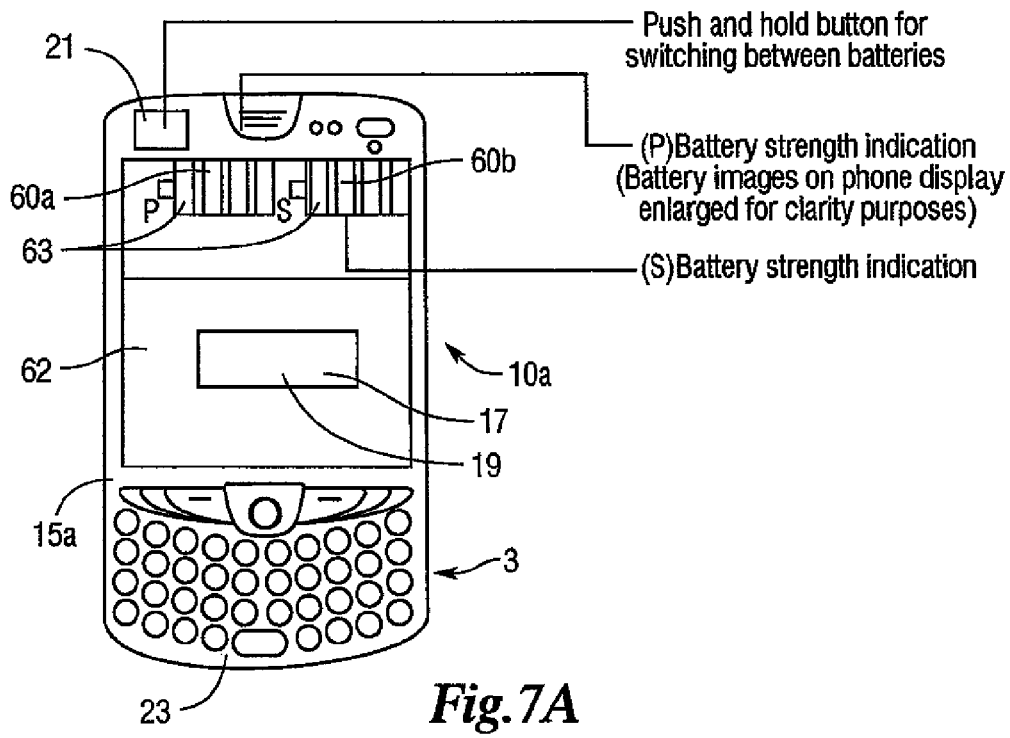
FIG. 7A is a top plan view of a personal digital assistant device.

FIG. 7A is an embodiment showing a battery cell phone combination 10 where the cell phone 15 is embodiment as a personal digital assistant 15a type device having the battery assembly 38.

Figure 8:
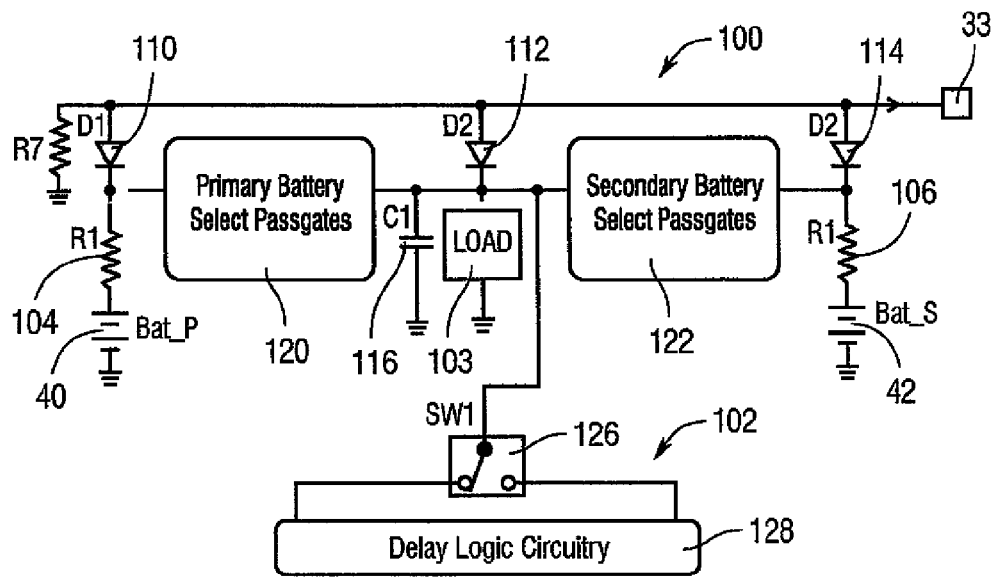
FIG. 8 is a block diagram of the circuit utilized in the cell phone battery combination.

Turning now to FIG. 8, shown therein is a block diagram of a circuit 100 for use in the battery cell phone combination 10. The circuit 100 accomplishes at least the following:

1) when the primary battery 40 is selected by the user, a load 103 (that can be in from a cell phone 15, a personal digital assistant 15a or a smart phone or other device when activated) is powered by the primary battery 40, and the secondary battery 42 is isolated from the load 103 and the primary battery 40;

2) when the secondary battery 42 is selected by the user, the load 103 is powered by the secondary battery 42, and the primary battery 40 is isolated from the load 103 and the secondary battery 42;

3) when the primary and secondary batteries 40, 42 are to be charged, both the primary and secondary batteries 40, 42 and the load 103 are powered by the charging device 33 (FIG. 7), and both the primary and secondary batteries 40, 42 are charged;

4) the user has the option of switching from the primary battery 40 to the secondary battery 42 and vice versa with a physical manually operable switch 126 or by software that controls the switch; and, 5) the power to the load 103 is maintained during switching between the primary and secondary batteries 40, 42, thus there are no gaps of time when switching between the primary and secondary batteries 40, 42, thus providing a constant supply of power to power the cell phone 15.

The circuit 100 includes a delay logic circuit 128, and the circuit 100 is powered in parallel with the load 103. As shown, a first resistor 104 is provided to protect the primary battery 40 during while it is being charged, and a second resistor 106 is provided to protect the secondary battery 42 while it is being charged. The first and second resistors 104, 106 are each about one (1) Ohm in one of the preferred embodiments. In another preferred embodiment the first and second resistors 104, 106 are absent.

During charging the first, second and third forward biased diodes D1, D2 and D3 indicated by reference numbers 110, 112 and 114, respectively, allow the primary and secondary batteries 40, 42 and the load 103 to be connected to a charging device 33. In addition, a switch capacitor 116 is provided and the switch capacitor 116 provides for a measure of uninterrupted and continuous power to the load 103 during switching between the primary and secondary batteries 40, 42. In one of the preferred embodiments the switch capacitor 116 is about 1 nanofarad (nF).

Figure 9:
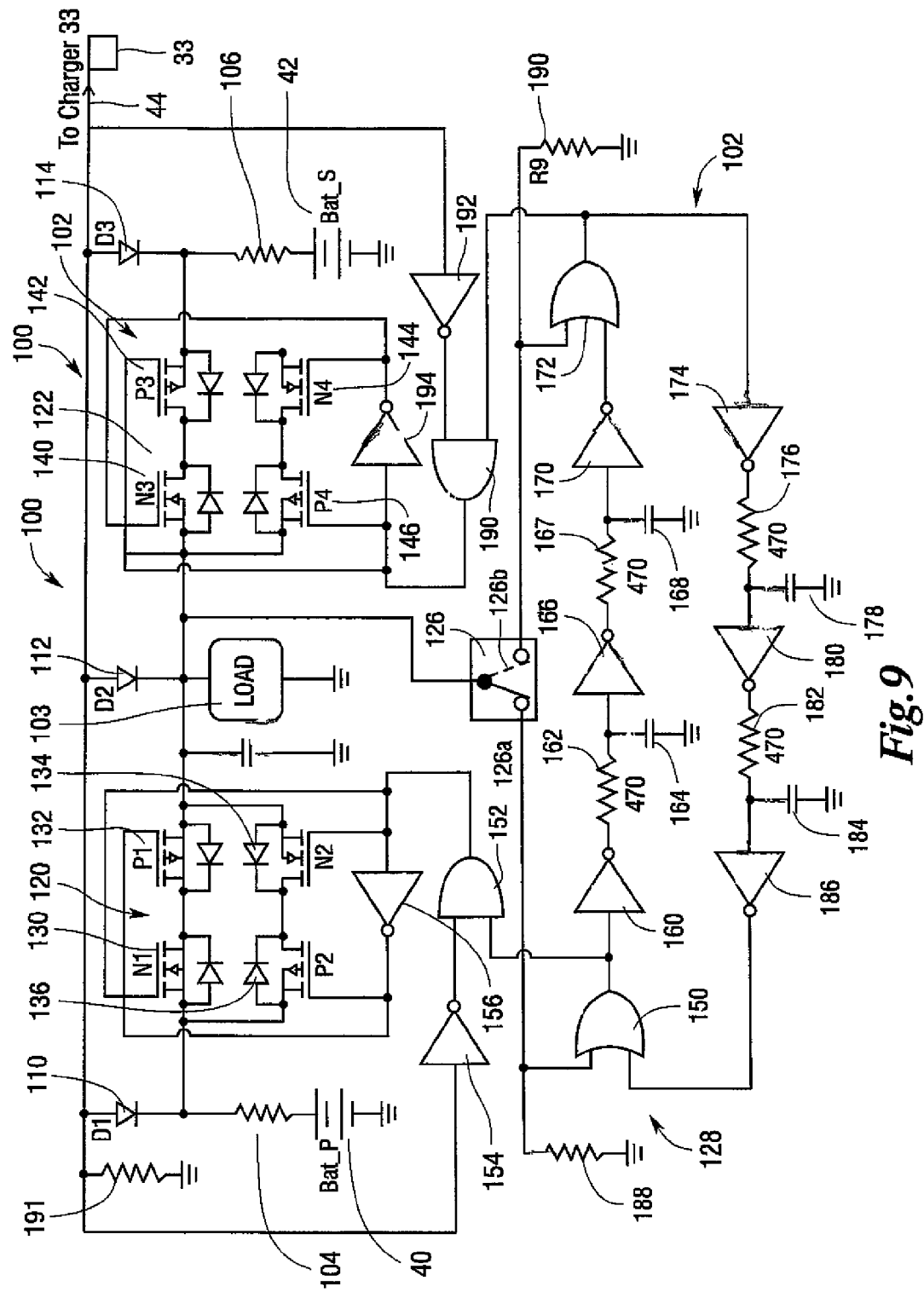
FIG. 9 is a schematic of the circuit for utilized in the cell phone battery combination.

As shown in FIG. 8, the circuit 100 further includes a delay logic circuit 128 that has primary battery and secondary battery passgates components 120, 122, respectively. The primary battery passgate component 120 is for selecting or isolating the primary battery 40 from the load 103, and the secondary battery passgate component 122 is for selecting or isolating the secondary battery 42 from the load 103. There is a switch 126 for selecting either the primary or secondary battery 40, 42. The switch 126 is movable from a primary battery switch position 126a and a secondary battery switch position 126b (FIG. 9). The delay logic circuit 128 operatively associated with the switch 126.

FIG. 9 is a schematic of the circuit 100 shown in block diagram form in FIG. 8. During charging, the first, second and third forward biased diodes D1 (reference number 110), D2 (reference number 112) and D3 (reference number 114), respectively, enable the primary and secondary batteries 40, 42 and the load 103 to all be connected to the charging device 33. While charging takes place, the primary and secondary passgate components 120, 122 are turned off.

Upon removal of the charging device 33 the first, second and third forward biased diodes D1, D2 and D3 become reverse biased, resulting in the primary and secondary batteries 40, 42 being isolated from one another and each being isolated from the load 103. Either the primary battery 40 or the secondary battery 42 is connected at any time and when not being charged for supplying power to the load 103. The user has the option of manually switching between the primary and secondary batteries 40, 42, for example when the cell phone 15 indicates on its screen display that power is about to run out of the primary battery 40.

As shown, the primary battery passgate component 120 includes a n-type (or channel) field effect transistor 130 (hereinafter referred to as the first NFET passgate 130) and designated N1 in the figure, and a first p-type (or channel) field effect transistor (hereinafter referred to as first PFET passgate 132) and designated P1 in the figure. It also includes a second NFET passgate 134 and designated N2, and a second PFET passgate 136 and designated P2. The first and second NFET passgates 130, 134 and the first and second PFET passgates 132, 136 are for allowing the selection (or isolation) of the load 103 from the primary battery 40. It is pointed out that NFET passgates and PFET passgates, their construction and use are well know to those having ordinary skill in the art and are therefore not described in greater detail herein.

Turning now to the secondary passgate component 122, the secondary passgate component 122 includes a third NFET passgate 140 and designated N3 in the figure, and a third PFET passgate 142 and designated P3 in the figure. It also includes a fourth NFET passgate 144 and designated N4, and a fourth PFET passgate 146 and designated P4. The third and fourth NFET passgates 140, 144 and the third and fourth PFET passgates 142, 146 are for allowing the selection or isolation of the load 103 from the secondary battery 42.

As shown, the switch 126 is in a primary battery switch position 126a when the cell phone 15 is in use is the load 103 and draws power from the primary battery 40. When the switch is in the primary battery switch position 126 the delay logic circuit 128 is powered by the primary battery 40. The delay logic circuit 128 has a first OR gate 150, and in one of the preferred embodiments is be embodied with four individual OR gates in one package (Quad 2-input OR). The first OR gate 150 output leads to a first AND gate 152, and in one of the preferred embodiments the first AND gate 152 is embodied with four individual AND gates in one package (Quad 2-input AND). Leading to the first OR gate 150 is the output from a first inverter 154, and in one of the preferred embodiments the first inverter 154 is embodied as a complementary metal-oxide-semiconductor (CMOS) hex inverter. The output from the first AND gate 152 is delivered to the first and second NFET passgates 130, 134, (N1 and N2) and the output of the first AND gate 152 is inverted in a second inverter 156 that is embodied as a CMOS hex inverter with six individual inverters in one of the preferred embodiments. The output of the second inverter 156 is delivered to the in the first PTEF passgate 132 (P1) and the second PTEF passgate 136 (P2) such that current is capable of flowing from the primary battery 40 to the load 103.

The output from the first OR gate 150 leads to a first delay logic inverter 160 (that is embodied as a CMOS inverter with six individual inverters in one of the preferred embodiments) and first delay logic resistor 162 (that is about 479 Ohms in one of the preferred embodiments) and charges a first delay logic capacitor 164 (that is about 0.22 uF in one of the preferred embodiments), and then to a second delay logic inverter 166 and second delay logic resistor 167 and charges a second delay logic capacitor 168, and then to a third delay logic inverter 170, the output of which is received by a second OR gate 172, and from there to a fourth delay logic inverter 174. From there the output is delivered to a third delay logic resistor 176 and charges a third delay logic capacitor 178.

Then it is received by a fifth delay logic inverter 180, a fourth delay logic resistor 182 and charges a fourth delay logic capacitor 184 and is then to a sixth delay logic inverter 186 where the output is inverted and fed back to the first OR gate 150. It is pointed out that the second, third, fourth, fifth and sixth 166, 170, 174, 180 and 186 are each embodied as CMOS inverters with six individual inverters in one of the preferred embodiments; and the second, third and fourth delay logic resistors 167, 176 and 182 are each about 479 Ohms in one of the preferred embodiments; and the second, third and fourth delay logic capacitors 168, 178 and 184 are each embodied as about 0.22 uF in one of the preferred embodiments.

There are also first and second delay logic circuit grounds 188, 190, and they are used to pull the unused switch node (depending on whether the switch 126 is in the primary or secondary battery switch position 126a, 126b) to ground, and each may be about 10 MegOhm in one of the preferred embodiments. In addition, there is a charge resistor 191 that is used to pull charge node to ground when there is no charge from the charging device 33. The charge resistor 191 is about 1 MegOhm in one of the preferred embodiments.

When the user detects the primary battery 40, for example an icon on the cell phone 15 indicating the power is almost depleted, the user moves the switch 126 from the a primary battery switch position 126a to the secondary battery switch position 126b as shown in dashed lines in FIG. 9. As the switch 126 is moved, the delay logic circuit 128 continues to power the primary battery passgate component 120 and the load 103. The load 103 continuously receives power when switching from the primary battery 40 to the secondary battery 42, and as a result phone calls will not be dropped and the user and person to whom he or she is talking to enjoys unimpeded conversation.

When the switch 126 is then moved to the secondary switch position 126b the secondary battery 42 supplies power to the load and to the delay logic circuit 128. The second OR gate 172 output moves through the delay logic circuit 128 in the manner previously described in connection with the primary battery 40 and to a second AND gate 190 that is embodied with four individual AND gates in one package in one of the preferred embodiments. Leading to the second AND gate 150 is the output from a third inverter 192, and in one of the preferred embodiments the third inverter 192 is embodied as a complementary metal-oxide-semiconductor (CMOS) hex inverter. The output from second AND gate 190 is delivered to the third and fourth PFET passgates 142, 146 (P3, P4), and the output of the second AND gate 190 is inverted in a fourth inverter 194 that is embodied as a CMOS inverter with six individual inverters in one of the preferred embodiments. The output of the forth inverter 190 is delivered to the third and fourth NTEF passgate 140, 144 (N3,N4) such that current is capable of flowing from the secondary battery 42 to the load 103.

The Switchover Process

When the primary battery 40 becomes low on charge a low warning alert is provided to the user via the cell phone 15, for example an audible beep or a warning light on the screen display of the cell phone 15. In one of the preferred embodiments, the user switches from the primary battery 40 to the secondary battery 42 by manually operating the switch 126.

In another preferred embodiment, when the primary battery 40 becomes low on charge a low warning alert is provided to the user via the cell phone 15, and the user can, by visiting a website or using an application "app" that causes the cell phone 15 to send a signal to the switch 126 in the cell phone 15. This signal automatically causes the switch to move to the secondary battery position 126b. The software required to move the switch from the primary batter switch position 126a to the secondary battery switch position 126b moves the switch. Programming an application for use in a cell or smart phone to cause a switch to be moved is within the skill level of those having ordinary skill in the art of programming such devices and is therefore not described in greater detail herein. Thereafter, the cell phone 15 will be powered by the secondary battery 42. This will provide the user with "another fully charged battery".

It is pointed out that in other preferred embodiments, the about described circuit 100 that includes the delay logic circuit 128 is readily adaptable for use in other electronic devices, such as laptop computers, notebook computers, iPhones®, iPads®, ebook readers, and other portable communication devices, for example, "walkie talkies", handheld transceivers, and any other electronic devices known to exist and all other possible future electronic devices. The, the present a battery cell phone combination 10 includes all such devices and suitable for use in any and all such devices.

Indications

As shown in FIG. 7A, a primary battery indication 60a and a secondary battery indication 60b are displayed on the screen 62 of the cell phone 15. The primary battery indication 60a indicates the power level status of the primary battery 40, and the secondary battery indication 60b indicates the power level status of the secondary battery 42. As shown, conventional battery life indication bars commonly designated 63 are displayed. And, a "P" is displayed for the primary battery 40 and an "S" is displayed for the secondary battery 42.

In addition, to prevent a manufacturer from making batteries that will fit into the casing 11 with just one internal battery (thereby never needing a reason to use the switchover process), in one of the preferred embodiments a continuity check for the primary battery positive terminal 50 and a negative primary battery terminal 52 and the secondary battery positive terminal 54 and a secondary battery negative terminal 56 is conducted by the cell phone 15 when powered on. If both the primary and secondary batteries 40, 42 are not detected, then the cell phone is rendered inoperative.

In one of the preferred embodiments, the user of the cell phone 15 is not able to access the secondary battery 42 without the assistance of a second party. The second party could be an organization that provides this service to cell phone users or the actual cell phone service provider. The second party would unlock the secondary battery 42 through the use of software. The secondary party can then charge a fee to the user for unlocking the secondary battery 42, for example a service charge of one dollar will appear on the user's phone bill.

This service by the second party would enable the secondary battery 42 for use. The second party may advertise this service as "charging" the backup battery. This service could be accessed through any of the following:

a) a web site (for example having a name such as chargemycellfone.com);

b) a phone number (for example 1-800-CHARGER), and a fee would be paid; or, c) a cell phone application, and the customer's account would be charged.

As shown in FIG. 7A, in another preferred embodiment, the cell phone 15 is provided with a reserve battery switch 21 that can be depressed and held to switch the power source from the primary battery 40 to the secondary battery 42 and vice-versa. During normal cell phone 15 usages the cell phone 15 powered by the primary battery 40. Then, when the charge in the primary battery 40 is drained (as indicated on the screen 62), the user, by depressing the reserve battery switch 21 powers the cell phone 15 with the secondary battery 42. The cell phone 15 detects that the user accessed the secondary battery 24. The cell phone service provider charges the user a fee when the user depresses the reserve battery switch 21 to access the secondary battery 42.

In other preferred embodiments all of the above-described ways for the user access the secondary battery 42 are provided for free by the cell phone service provider. That is, the user is not charged a fee for using the secondary battery 42.

Thus, the secondary battery 42 can be accessed in the event that the primary battery 40 is low on charge. This enables prolonged use of the cell phone 15 in situations where the cell phone 15 cannot be otherwise charged, especially in an emergency. The battery cell phone combination 10 provides a more convenient way of receiving an additional battery charge, compared to the conventional methods. As another advantage, the battery cell phone combination provides a portable method of "charging" a cell phone. In addition, the user can charge his or her cell phone 15 at an International Destination without having to adapt to the international equipment to charge the cell phone. Thus, crossing borders poses no problem for a user who needs to charge his or her cell phone 15.

In another preferred embodiment the switching from the primary battery 40 to the secondary battery 42 is automatically carried out without the need for the user to manually move the switch 126. In such an embodiment the circuit 100 includes a multimeter capable of measuring voltage, current and resistance to detect the energy reserve of the primary battery 40. The use, operation and construction of multimeters is known to those having ordinary skill in the art. When the multimeter reaches a predetermined level the switch is automatically moved to the secondary battery switch position 126b, and this may be accomplished with a suitable software program. Software programs for throwing switches are well known to those having ordinary skill in the art and are therefore not described herein in greater detail herein.

In another preferred embodiment, in addition to the secondary battery there are additional batteries, namely third and fourth back-up batteries, or any desired number of batteries required for a particular application. A circuit substantially identical to the circuit 100 is provided to such that when the secondary battery 42 is depleted of power another switch can be moved such that the cell phone 15 is powered by the third battery. A forth back up battery can be provided to power the cell phone 15 in a similar manner. It is to be understood that switching to the additional batteries can be accomplished automatically as described above.

It will be appreciated by those skilled in the art that while the battery cell phone combination 10 has been described in connection with particular embodiments and examples, the battery cell phone combination 10 is not necessarily so limited and that other examples, uses, modifications, and departures from the embodiments, examples, and uses may be made without departing from the battery cell phone combination 10. All these embodiments are intended to be within the scope and spirit of the appended claims.

What is claimed:

1. A combination cell phone comprising:
   a cell phone having a cell phone housing;
   a battery assembly disposed in the cell phone housing, and the battery assembly having a primary battery and a secondary battery and wherein the primary and secondary batteries are isolated from one another and each is for powering a load derived from the cell phone;
   a circuit disposed in the cell phone housing and a switch is operatively associated with the cell phone and the primary and secondary batteries such that either the primary or secondary battery is capable of powering the cell phone;
   the circuit includes a delay logic circuit operatively associated with a switch allowing for uninterrupted cell phone operation when switching from the primary battery to the secondary battery;
   the circuit includes a primary battery passgate component for selecting or isolating the primary battery from a load;
   the circuit includes a secondary battery passgate component for selecting or isolating the secondary battery from the load; and,
   wherein the primary passgate component includes a first NFET passgate, a first PFET passgate, a second NFET passgate and second PFET passgate each being operatively associated with the delay logic circuit and for allowing either the selection or the isolation of the load from the primary battery.

2. The combination cell phone according to claim 1 wherein the switch is movable from a from a primary battery switch position to a secondary battery switch position and vice versa.

3. The combination cell phone according to claim 1 wherein the delay logic circuit includes a first OR gate operatively associated with a first AND gate and the first AND gate is operatively associated with the primary passgate component.

4. The combination cell phone according to claim 1 wherein the secondary passgate component includes a third NFET passgate, a third PFET passgate, a fourth NFET passgate and fourth PFET passgate each being operatively associated with the delay logic circuit and for allowing either the selection or the isolation of the load from the secondary battery.

5. The combination cell phone according to claim 4 wherein the delay logic circuit includes a second OR gate operatively associated with a second AND gate and the second AND gate is operatively associated with the secondary passgate component.

6. The combination cell phone according to claim 1, further wherein:
   the delay logic circuit includes a first OR gate operatively associated with a first AND gate and the first AND gate is operatively associated with the primary passgate component;
   the delay logic circuit includes a second OR gate operatively associated with a second AND gate and the second AND gate is operatively associated with the secondary passgate component;
   the secondary passgate component includes a third NFET passgate, a third PFET passgate, a fourth NFET passgate and fourth PFET passgate each being operatively associated with the delay logic circuit and for allowing the allowing either the selection or the isolation of the load from the secondary battery, such that when the switch is in the primary battery switch position the primary battery powers the load and the delay logic circuit and when the switch is in the secondary battery switch position the secondary battery powers the load and the delay logic circuit and the delay logic circuit provides power to the load when the switch is moved from the first primary battery switch position such that power to the load is uninterrupted.

7. The combination cell phone according to claim 1 wherein a charging device is provided and the primary and secondary batteries and the load are simultaneously charged by the charging device during charging, and wherein after charging the primary and secondary batteries are isolated from one another.

8. A method of providing power to a device comprising the acts of:
  providing a battery assembly having primary and secondary batteries and isolating the primary and secondary batteries from one another;
  providing a switch to select either the primary battery or the secondary battery;
  providing the device with a screen display and indicating on the screen display the amount of charge remaining in the primary and secondary batteries on the screen display;
  providing the device with a circuit with a delay logic circuit that is operatively associated with the first and second batteries such the device is continuously powered when the switch is moved from the primary battery position to the secondary battery position; and,
  further including providing a cell phone service provider company and providing the cell phone service provider with control over the switch and allowing the cell phone service provider company to charge a fee when the switch is moved from the primary battery position to the secondary battery position.

9. The method according to claim 8 further including providing a web site service provider company that provides a service of allowing the secondary battery to be accessed over the internet, providing the web site service company with control over the switch, having a cell phone user access a web site hosted by the web site service provider company wherein upon the user paying a fee the web site service provider company remotely allows the user to access the secondary battery.

10. The method according to claim 8 further including providing a cell phone service provider company and wherein the cell phone service provider company provides a phone number such that upon a user calling the phone number the user can request and receive access to the secondary battery and charging the cell phone user a fee, and wherein the service provider remotely allows the cell phone user the ability to moving the switch to the secondary battery position.

11. A combination electronic device comprising:
  a electronic device having a housing;
  a battery assembly disposed in the housing, and the battery assembly having a primary battery and a secondary battery and wherein the primary and secondary batteries are isolated from one another and each is for powering a load derived from the electronic device;
  a circuit disposed in the housing and a switch is operatively associated with the electronic device and the primary and secondary batteries such that either the primary or secondary battery is capable of powering the electronic device;
  the circuit includes a delay logic circuit operatively associated with a switch allowing for uninterrupted electronic device operation when switching from the primary battery to the secondary battery;
  the circuit includes a primary battery passgate component for selecting or isolating the primary battery from a load;
  the circuit includes a secondary battery passgate component for selecting or isolating the secondary battery from the load; and,
  wherein the primary passgate component includes a first NFET passgate, a first PFET passgate, a second NFET passgate and second PFET passgate each being operatively associated with the delay logic circuit and for allowing either the selection or the isolation of the load from the primary battery.

12. The combination electronic device according to claim 11 wherein the delay logic circuit includes a first OR gate operatively associated with a first AND gate and the first AND gate is operatively associated with the primary passgate component.

13. The combination electronic device according to claim 11 wherein the secondary passgate component includes a third NFET passgate, a third PFET passgate, a fourth NFET passgate and fourth PFET passgate each being operatively associated with the delay logic circuit and for allowing either the selection or the isolation of the load from the secondary battery.

14. The combination electronic device according to claim 13 wherein the delay logic circuit includes a second OR gate operatively associated with a second AND gate and the second AND gate is operatively associated with the secondary passgate component.

15. The combination electronic device according to claim 11 further wherein:
  the delay logic circuit includes a first OR gate operatively associated with a first AND gate and the first AND gate is operatively associated with the primary passgate component;
  the delay logic circuit includes a second OR gate operatively associated with a second AND gate and the second AND gate is operatively associated with the secondary passgate component; and,
  the secondary passgate component includes a third NFET passgate, a third PFET passgate, a fourth NFET passgate and fourth PFET passgate each being operatively associated with the delay logic circuit and for allowing either the selection or the isolation of the load from the secondary battery, such that when the switch is in the primary battery switch position the primary battery powers the load and the delay logic circuit and when the switch is in the secondary battery switch position the secondary battery powers the load and the delay logic circuit and the delay logic circuit provides powers the load when the switch is moved from the first primary battery switch position such that power to the load is uninterrupted.

* * * * *